(12) United States Patent
Cleary et al.

(10) Patent No.: US 6,494,178 B1
(45) Date of Patent: Dec. 17, 2002

(54) COMBUSTION CHAMBER INCLUDING PISTON FOR A SPARK-IGNITION, DIRECT-INJECTION COMBUSTION SYSTEM

(75) Inventors: David J. Cleary, West Bloomfield, MI (US); Tang-Wei Kuo, Troy, MI (US); Paul M. Najt, Bloomfield Hills, MI (US); Ko-Jen Wu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/930,707

(22) Filed: Aug. 13, 2001

(51) Int. Cl.$^7$ .................................................. F02F 3/21
(52) U.S. Cl. ...................... 123/276; 123/193.6; 123/661
(58) Field of Search ............................ 123/276, 193.6, 123/661, 294

(56) References Cited

U.S. PATENT DOCUMENTS

| 4,565,181 | A | * | 1/1986 | August | 123/661 |
|---|---|---|---|---|---|
| 5,115,774 | A | * | 5/1992 | Nomura et al. | 123/276 |
| 5,209,200 | A | * | 5/1993 | Ahern et al. | 123/276 |
| 5,320,075 | A | * | 6/1994 | Regueiro | 123/193.6 |
| 5,553,588 | A | | 9/1996 | Gono et al. | 123/276 |
| 6,035,823 | A | | 3/2000 | Koike et al. | 123/276 |
| 6,129,065 | A | * | 10/2000 | Ueda et al. | 123/193.6 |
| 6,286,477 | B1 | * | 9/2001 | Yang et al. | 123/276 |
| 6,311,665 | B1 | * | 11/2001 | Yasuoka et al. | 123/276 |

* cited by examiner

Primary Examiner—Marguerite McMahon
(74) Attorney, Agent, or Firm—Kathryn A. Marra

(57) ABSTRACT

An engine combustion chamber includes a cylinder head, a cylinder wall and a piston. The piston has a bowl volume formed therein. A fuel injector is disposed adjacent one edge of the bowl and an ignition source is within a predetermined distance of another, substantially opposite, edge of the bowl. The bowl has a transporting surface which directs a fuel-air charge from the bowl volume toward the ignition source. The piston, bowl and cylinder head cooperate through a plurality of design features to provide an efficient combustion chamber.

5 Claims, 2 Drawing Sheets

COMBUSTION CHAMBER INCLUDING PISTON FOR A SPARK-IGNITION, DIRECT-INJECTION COMBUSTION SYSTEM

TECHNICAL FIELD

This invention relates to pistons for use in engines having direct-injection fuel systems.

BACKGROUND OF THE INVENTION

Spark-ignition, direct-injection combustion systems for internal combustion engines have been proposed to improve fuel economy when compared with more typical port fuel-injected combustion systems. The spark-ignition, direct-injection engine is provided with a high pressure fuel injection system that sprays fuel directly into the engine combustion chamber which is formed, at least partially, in the piston. The fuel is directed or transported to a specific region within the combustion chamber. This creates a stratified charge in the combustion chamber resulting in fuel economy benefits since the throttling requirements are less restrictive and the fuel combustion characteristics are improved. It has become the practice of engine designers to incorporate design features in the piston toward this end.

U.S. Pat. No. 5,553,588 issued Sep. 10, 1996, for example, discloses a combustion chamber design with improved fuel distribution in mind. This prior art describes a combustion chamber that is partially formed in the piston. The combustion chamber has a plurality of fuel regions defined by walls including two arcuate-shaped regions interconnected by a linear region. These regions cooperate to accommodate swirling of the fuel entering the combustion chamber. The ignition source, a spark plug, is positioned with the electrodes protruding into the combustion chamber near the linear region and the fuel is injected at one of the arcuate regions.

U.S. Pat. No. 6,035,823, issued Mar. 14, 2000, describes a piston, injector and igniter combination wherein the piston has a circumferential wall having a predetermined radius and wherein the center of the circumferential wall is located a predetermined distance from the injector. The circumferential wall has an arc-shaped cross section that redirects the fuel toward the igniter. The piston configuration of this patent requires that the injector have a flat sector-shaped spray pattern.

SUMMARY OF THE INVENTION

It is an object of the present invention to provide an improved combustion chamber having a portion thereof defined in the piston head.

In one aspect of the present invention, the combustion chamber is formed between a cylinder head and a piston with a piston bowl being formed therein. In another aspect of the present invention, the piston bowl has a floor and a transporting surface. In yet another aspect of the present invention, the combustion chamber has exhaust squish surfaces and intake squish surfaces formed between the piston external of the bowl and a combustion chamber surface on the cylinder head. In still another aspect of the present invention, the piston bowl volume is in the range of 50% to 70% of the total volume of the combustion chamber at piston top dead center.

In yet still another aspect of the present invention, the bowl depth and the location of the transporting surface have dimensional ranges that are essential to the present invention. In a further aspect of the present invention, the exhaust squish heights are in a range of 2–6 mm. In yet a further aspect of the present invention, the upper edge of the transporting surface is located in the range of 6–10 mm from the centerline of the ignition source and has an included negative draft angle in the range of 0 to −20 degrees. In still a further aspect of the present invention, the bed of the bowl and a flat portion or the upper edge of the transporting surface are connected by an arcuate surface that is tangential to both.

DESCRIPTION OF AN EXEMPLARY EMBODIMENT

Figure 1:
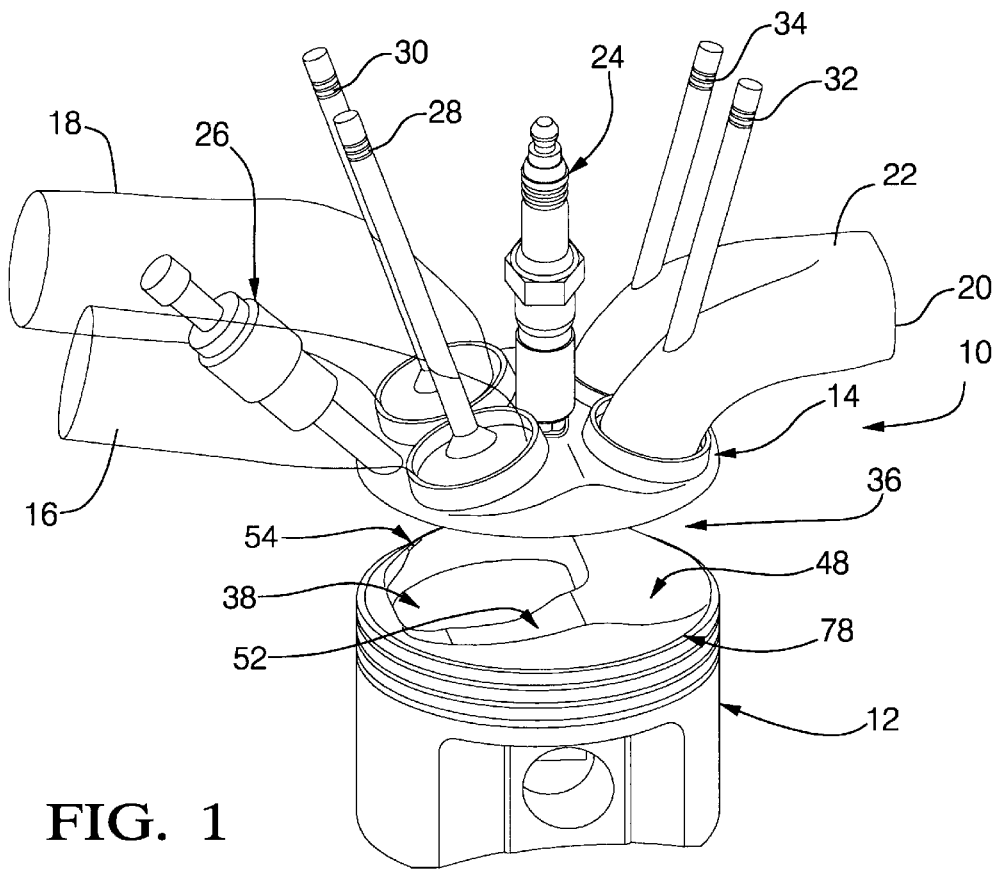
FIG. 1 is an isometric view of a portion of an engine containing a piston and a portion of a cylinder head with the intake and exhaust valves, the ignition source and the fuel injector incorporating the present invention.

A portion of an engine 10 includes a piston 12 and a cylinder head 14. The cylinder head 14 has a primary inlet port 16, a secondary inlet port 18, a pair of outlet ports 20 and 22, an ignition source or spark plug 24, a fuel injector 26, two inlet valves 28 and 30 and two exhaust valves 32 and 34. The spark plug 24 is a conventional device that supplies an ignition source or spark to the combustion chamber 36 formed between the piston 12, a cylinder wall or bore 37, and the cylinder head 14. The fuel injector 26 is a conventional direct injection device that is designed to inject fuel into the combustion chamber 36 during engine operation. The amount and timing of the fuel injection is controlled by a conventional electronic control unit (ECU) that includes a programmable digital computer. These control devices are well known to those skilled in the art of engine design.

The inlet valve 28 controls the flow of air into the combustion chamber 36 through the primary inlet port 16, and the inlet valve 30 controls the flow of air into the combustion chamber 36 through the secondary inlet port 18. The exhaust valves 32 and 34 control the flow of exhaust products from the combustion chamber 36 through the exhaust ports 20 and 22, respectively. The opening and closing of the valves 28, 30, 32 and 34 is controlled in a conventional manner such as through the employment of a cam mechanism, not shown.

Figure 2:
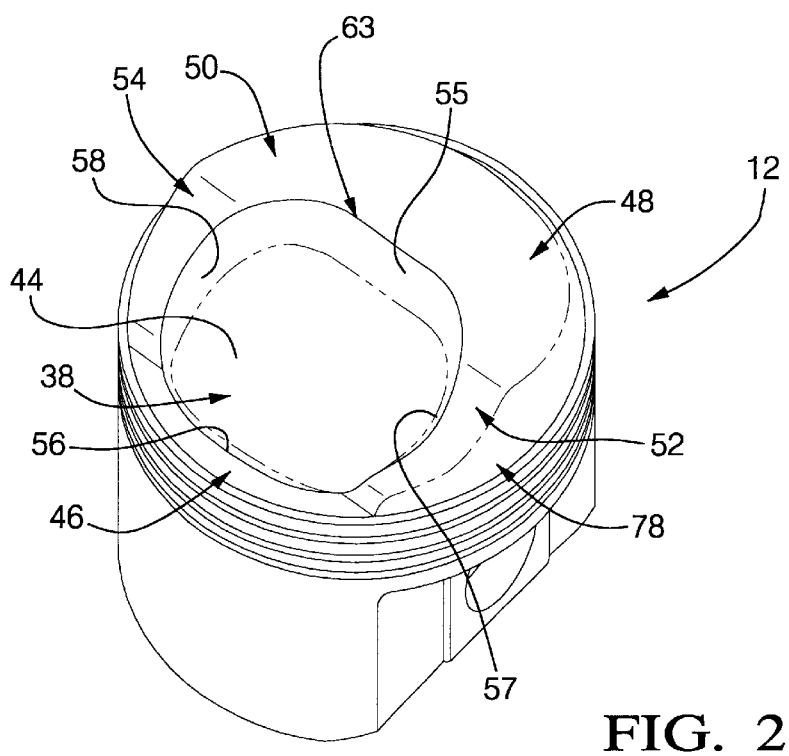
FIG. 2 is an isometric view of a piston incorporating the present invention.
Figure 3:
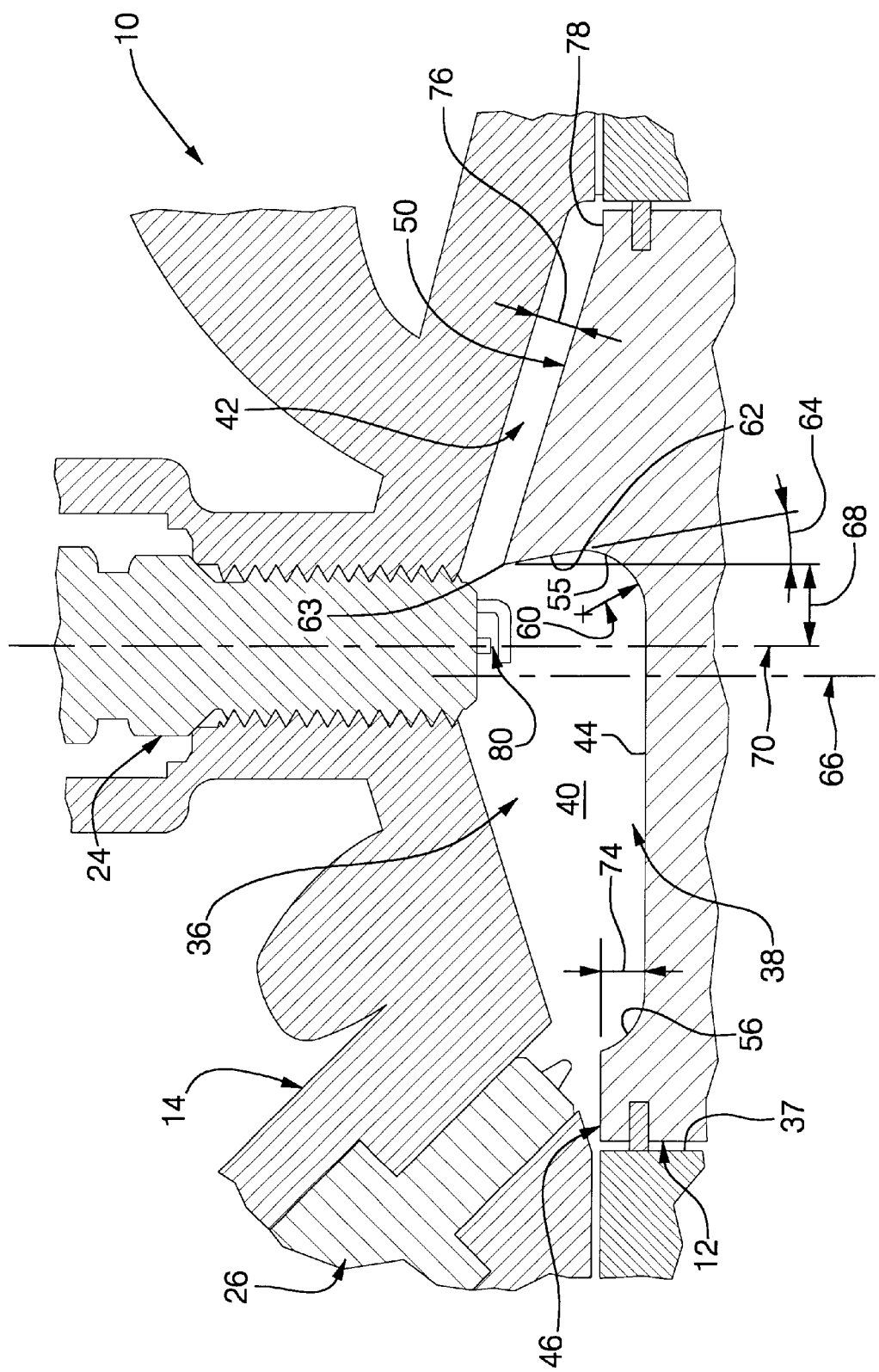
FIG. 3 is a partial cross-sectional elevational view of a piston and cylinder head incorporating the present invention.

As best seen in FIGS. 2 and 3, the piston 12 has a bowl 38 formed therein. The combustion chamber 36 includes a bowl volume 40 and a volume space 42. The bowl volume 40 consists of the volume of the bowl 38 and the space between the bowl 38 and the cylinder head 14. The volume space 42 includes the volume between the cylinder head 14 and the piston 12 external to the periphery of the bowl 38. The bowl 38 has a floor 44, an inner edge of a rim surface 46, inner edges of exhaust squish surfaces 48 and 50, inner edges of inlet squish surfaces 52 and 54, a transporting surface 55, and three side surfaces 56, 57 and 58 that connect with the transporting surface 55 to surround the bowl and extend upward to the edges of, respectively, the rim surface 46, the inlet squish surfaces 52 and 54, and the linear edge 63 that forms the inner edges of the exhaust squish surfaces 48 and 50.

The transporting surface 55 includes a bowl radius 60, having a dimension in the range of from 3 to 12 mm, and, optionally, a flat surface 62. Together, the bowl radius and the flat surface, if provided, extend upward from the floor 44 to a substantially linear edge 63. The floor 44 and the flat surface 62, if provided, are tangential to the bowl radius 60. The flat surface 62 (or the upper edge of the bowl radius 60 if there is no flat surface) intersects the squish surfaces 48 and 50 at a negative draft angle 64 (FIG. 3) in the range of 0 to −20 degrees, relative to the axis 66 of the cylinder bore 37. This forms the linear edge 63, which is laterally displaced a distance 68 in the range of 6 to 10 mm from the centerline 70 of the spark plug 24. The side surface 56 is formed as a radius surface that connects tangentially with the floor 44 and the side surfaces 57 and 58 also connect with the floor by tangential radii, not clearly shown. The rim surface 46 is spaced a distance 74 (3 to 8 mm) from the floor 44.

The exhaust squish surface 48 is positioned opposite the exhaust valve 32 and the exhaust squish surface 50 is positioned opposite the exhaust valve 34. The intake squish surfaces 52 and 54 are positioned opposite the intake valves 28 and 30, respectively. When the piston 12 is at top dead center in the cylinder 37, as shown in FIG. 3, the squish clearance or distance 76 between the cylinder head 14 and the respective squish surfaces 48, 50, 52 and 54 is in the range of 2 to 6 mm. The volume ratio (VR) of the bowl volume (VB) to total combustion chamber volume (VT) at top dead center is also an important design parameter insuring that proper combustion will occur. The total volume of the combustion chamber 36 at top dead center is the space volume 42 plus the bowl volume 40. Thus, the volume ratio is the bowl volume 40 divided by space volume 42 plus bowl volume 40 (VR=VB/VT). This volume ratio is maintained in the range 0.50 to 0.70. This means that the bowl volume is 50% to 70% of the total combustion chamber volume at piston top dead center. A peripheral surface 78 extends around the outer edge of the piston 12 from the inlet squish surface 52 past the exhaust squish surfaces 48 and 50 to the inlet squish surface 54. The peripheral surface 78 is an extension of the rim surface 46 and has a radial dimension in the range of 0 to 6 mm. The outer edges of the peripheral surface 78 and the rim surface 46 essentially define the outer edge of the piston 12 and, due to the close proximity of the cylinder wall 37, the outer periphery of the combustion chamber 36.

When the engine is operating in a stratified charge combustion mode, the piston 12 is reciprocated in the cylinder bore 37 such that the combustion chamber 36 expands and contracts during the operating cycle of the engine. During the intake stroke, one or both of the intake valves 28, 30 are opened to admit an air mass into the cylinder bore. During the compression stroke, the valves are closed and the air mass is compressed as the piston approaches top dead center. Also during the compression stroke, fuel is injected directly into the combustion chamber 36 by the fuel injector 26 to mix with the air mass. The amount and timing of fuel injected is controlled by the ECU. The fuel-air mixture is ignited by the spark plug 24 at or slightly before top dead center. The ignited mixture is rapidly expanded as the piston moves down during the power stroke. At approximately bottom dead center, the exhaust valves 32 and 34 are opened and the piston 12 again moves upward toward the cylinder head 14 during the exhaust stroke so that the exhaust gases are forced from the cylinder bore. The intake stroke is then repeated.

When fuel is injected into the air mass, it is carried across the floor 44 of the bowl 38 toward the transporting surface 55 as it mixes with the air mass. The edge 63 of the transporting surface 55 directs the fuel-air mixture to a spark gap 80 of the spark plug 24 where ignition begins. The ignited fuel-air mixture rapidly expands to encompass the entire combustion chamber 36 and efficiently deliver power from the engine. The dimensional parameters of the piston 12 and the combination of the piston 12 and cylinder head 14 are important factors in the distribution of the fuel-air mixture and the resulting combustion sequence.

The engine will be operated as described above to create stratified charges in the combustion chamber to permit the ignition of lean fuel-air mixtures under low and intermediate loads. At loads nearer the maximum power of the engine, a homogeneous fuel distribution mode may be used. In this mode, the fuel will be injected during the intake stroke to mix with the inlet air prior to interaction with the piston bowl features described, which are provided primarily for stratified charge operation.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A combustion chamber for an internal combustion engine comprising:

a cylinder head having an inlet port and an exhaust port formed therein with valve members disposed in the ports for controlling the flow of air and products of combustion to and from the combustion chamber, an ignition source, and a fuel injection device;

a cylinder positioned to receive air and fuel injected directly from the fuel injection device;

a piston mounted for reciprocation in the cylinder, said piston including a bowl into which the fuel is injected, the bowl having a floor, a rim surface, a transporting surface and side surfaces joined with the transporting surface;

said transporting surface including an arcuate surface tangential with the floor and a linear edge spaced a predetermined distance from a centerline of said ignition source, and said transporting surface at the linear edge being disposed at a negative draft angle in the range of zero degrees to minus twenty degrees relative to an axis of the cylinder bore; and a generally flat peripheral surface extending around the piston from said rim surface, said rim surface being displaced above the floor by a distance in the range of three to eight millimeters.

2. A combustion chamber as in claim 1 including:

said predetermined distance being in the range of six to ten millimeters; and said arcuate surface having a radius in the range of three to twelve millimeters.

3. A combustion chamber as in claim 1 including:

said cylinder head having two exhaust ports with an exhaust valve in each exhaust port and two inlet ports with an inlet valve in each inlet port; and exhaust squish surfaces on the piston between said transporting surface and said peripheral surface of the piston and positioned opposite respective ones of the exhaust valves, intake squish surfaces on the piston between opposite sides of the bowl and said peripheral surface and positioned opposite respective ones of said intake valves, each exhaust squish surface and each intake squish surface being spaced from said cylinder head by a dimension in the range of two to six millimeters when said piston is at a top dead center location in said cylinder bore.

4. A combustion chamber as in claim 1 including:

said bowl having a bowl volume defined by a bowl recess and a space between the bowl and the cylinder head when the piston is at a top dead center location in said combustion chamber;

said combustion chamber having a total volume defined by the space between the piston and the cylinder head including the bowl volume when the piston is at the top dead center location; and said bowl volume being in the range of 50% to 70% of the total volume.

5. A combustion chamber as in claim 3 wherein said peripheral surface has a radial dimension in the range of from zero to six millimeters.

* * * * *